June 1, 1965           J. W. ANGELL           3,186,730

FLUID SUSPENSION SYSTEM FOR VEHICLES

Filed May 11. 1961                     5 Sheets–Sheet 1

FIG. 1

INVENTOR
JAMES W. ANGELL
BY
his ATTORNEYS

June 1, 1965     J. W. ANGELL     3,186,730
FLUID SUSPENSION SYSTEM FOR VEHICLES
Filed May 11, 1961     5 Sheets-Sheet 5

INVENTOR.
JAMES W. ANGELL

United States Patent Office 3,186,730
Patented June 1, 1965

3,186,730
FLUID SUSPENSION SYSTEM FOR VEHICLES
James W. Angell, 4926 Goodridge Ave.,
New York 71, N.Y.
Filed May 11, 1961, Ser. No. 109,449
27 Claims. (Cl. 280—104)

This invention relates to an improved fluid suspension system for vehicles which functions to support the chassis for smooth riding with a minimum of angular orientation as the vehicle travels over irregular terrain and/or as the vehicle turns on curves. The fluid suspension system of the present invention represents an improvement over the spring suspension system described in my copending application Serial No. 55,913, filed September 14, 1960.

In the conventional types of suspension systems for vehicles in use today, each wheel is connected directly by some mechanical, pneumatic or hydraulic spring device to the general area of the chassis which is nearest that wheel, usually the corner of the chassis. Therefore, when the vehicle is in motion, and when a particular wheel hits a bump or a depression in the road surface, all or nearly all of the resulting impact is initially transmitted to that general area of the chassis. Where that area is the corner of the chassis, the resutl is to raise or lower the corner abruptly, thereby angularly orienting the chassis from its normal level condition. The consequence of hitting a series of bumps and depressions is to impart the familiar disagreeable sequence of tilting, fore-and-aft pitching, swaying and corkscrew motions to the vehicle.

Another disadvantage of conventional suspension systems is that when turning on curves the chassis tends both to sway and tilt outwardly, thereby greatly increasing the danger of rolling over at higher speeds.

The suspension system of the present invention eliminates these undesirable effects by providing a fluid system which not only cushions the impact caused by a wheel hitting a bump, but divides the vertical displacement imparted to the wheel between diagonally opposite corners of the vehicle. Thus, not only is the vertical displacement of the chassis reduced to approximately one-half the vertical displacement of the wheel, but angular orientation of the chassis is virtually eliminated. The fluid system of the present invention is also designed to resist, or at least minimize, angular orientation of the chassis caused by a wheel hitting a hole or depression in the road.

In addition, the suspension system of the present invention includes an auxiliary pressure-transmitting system in which fluid pressure is utilized to raise the lower corner or corners of a tilted chassis in order to reduce the angle of tilt, for example, caused by a curve or slope. The auxiliary fluid system also operates automatically in conjunction with means for maintaining the pressure in the main fluid system at a predetermined level to introduce initially and thereafter to maintain the desired quantity of fluid in the main system.

For a complete understanding of the present invention and the various features and advantages thereof, reference should be made to the detailed description which follows and to the accompanying drawings in which.

Figure 1:
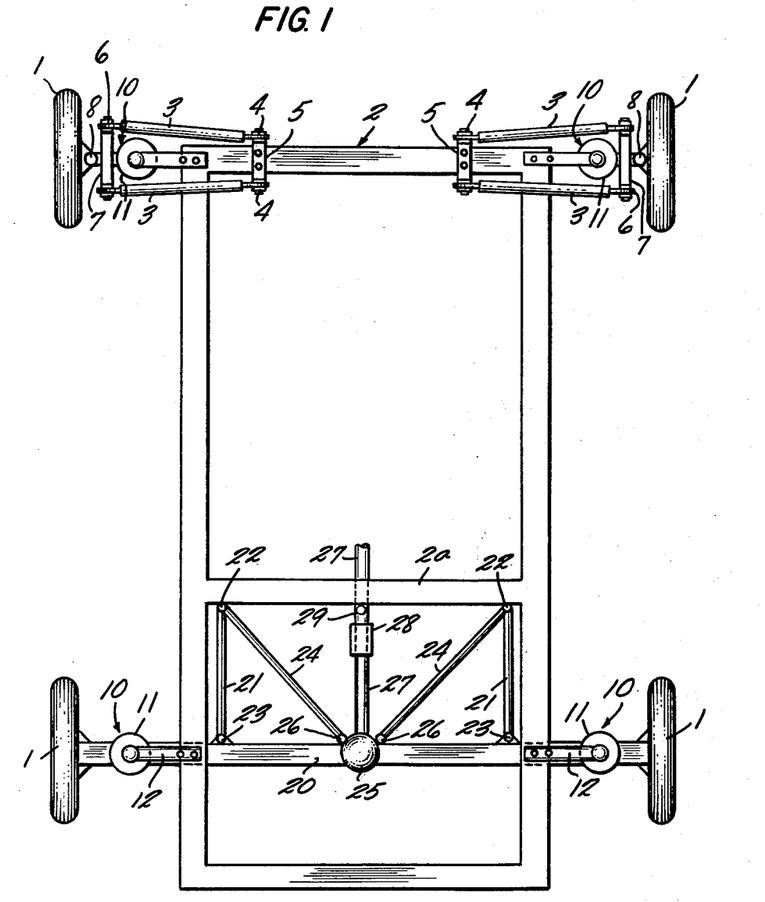
FIGURE 1 is a plan view showing the mechanical elements of the suspension system of the present invention with the fluid system eliminated (also eliminated are the brake drums, steering assemblies, shock absorbers, etc. of the vehicle which are not related to the present invention)
Figure 3:
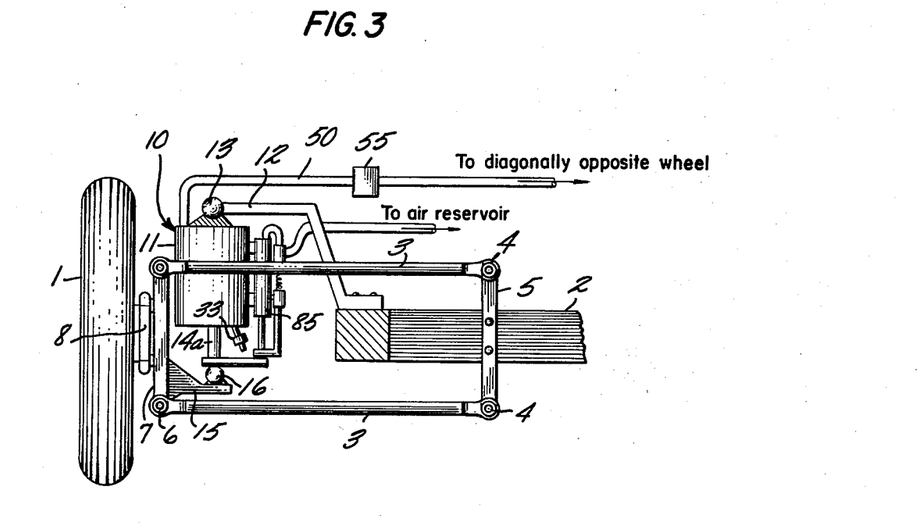
FIGURE 3 is an elevational view of the left front wheel assembly as viewed from the rear.

The spring suspension system of the present invention is shown and described herein as applicable to a vehicle having a wheel 1 at each corner of a chassis 2. As shown in FIGURES 1 and 3, each of the front wheels is connected to the adjacent corner of the chassis by a parallelogram linkage arrangement which includes four pivoted radius rods 3. The inner ends of the radius rods 3 are connected by pivots or hinges 4 to a bracket 5 mounted to the front end of the chassis. The outer ends of the radius rods are connected by similar fixed pivots or hinges to a wheel plate 7 to which the corresponding wheel is connected by a kingpin 8. Each pair of radius rods lying in the same horizontal plane converge somewhat from the respective wheel plate toward the chassis; also each pair of radius rods lying in the same vertical plane are parallel to one another. These parallelogram linkages give the respective wheel plate freedom to move vertically, but prevent angular orientation of the wheel plate with respect to the chassis by maintaining the wheel plate in a vertical plane at all times and also prevent any fore-and-aft movement of the wheel plate with respect to the chassis.

The front wheels are, of course, mounted to the respective wheel plate with the desired camber, caster and toe-in, and the wheels are free to be turned by the steering mechanism in the usual manner.

Each of the front end corners of the chassis 2 is connected to its respective wheel through a fluid cushioning means, namely, a piston and cylinder arrangement, generally designated by the reference numeral 10. For example, referring to FIGURES 3 and 5 of the drawings, the top of each cylinder 11 is connected to a laterally extending bracket 12 of the chassis by a universal joint 13 which permits the angle of the cylinder to vary with respect to the bracket 12, within limits, in any direction. The cylinder 11 accommodates a movable piston 14 therein which divides the interior of the cylinder into upper and lower chambers 11a and 11b, respectively. A piston rod 14a extends downwardly through the bottom of the cylinder, and the lower end of the piston rod is connected by a universal joint 16 to a bracket 15 affixed to the inner face of the wheel plate 7, the joint 16 permitting the angle between the piston rod and the bracket to vary, within limits, in any direction.

Figure 4:
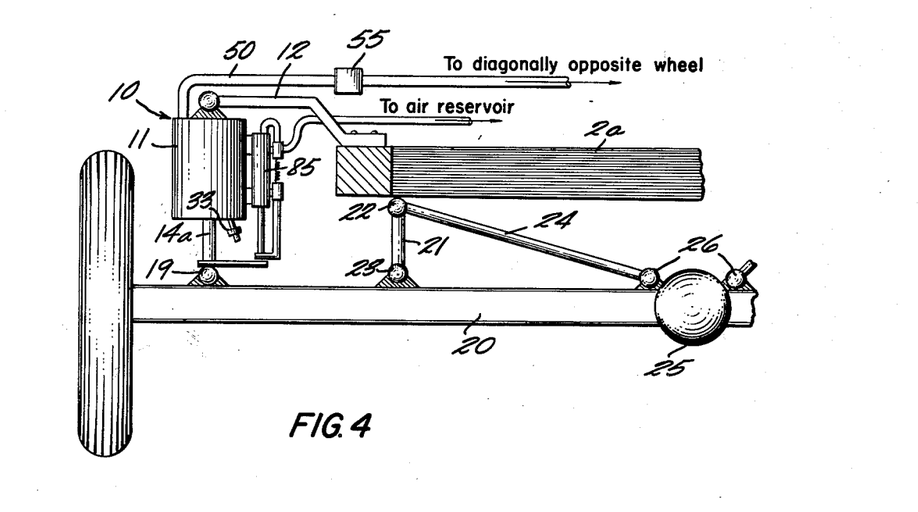
FIGURE 4 is an elevational view of the left rear wheel assembly as viewed from the rear.

At the rear of the vehicle, each rear wheel is attached to the conventional axle housing 20 in the usual way. Furthermore, each of the rear corners of the chassis 2 is connected to the axle housing through a piston and cylinder arrangement 10 similar to those used at each of the front corners of the chassis. As shown in FIGURE 4 of the drawings, each of the rear cylinders is connected to the respective corner of the chassis in precisely the same manner as are the cylinders associated with the front wheels; however, the lower end of the piston rod 14a is connected directly to the axle housing 20 by a universal joint 19. The axle housing, in turn, is connected to an intermediate cross-frame 2a of the chassis by a pair of rigid rods 21, one at each side of the chassis. The front end of each rod 21 is connected by a universal joint 22 to the cross-frame 2a, and the rear end of each rod is connected by universal joint 23 to the axle housing. These rods transmit fore-and-aft motion to the chassis from the rear wheels of the vehicle. Two rigid diagonal rods 24 prevent any lateral motion of the axle housing relative to the chassis. At its forward outer end, each of the rods 24 is attached to the corresponding joint 22, and its rearward inner end the rod is attached to the differential housing 25 by a universal joint 26. Since in this arrangement an upward movement of one rear wheel relative to the other will tend to shorten slightly the drive transmission shaft 27, the forward and rearward portions of this shaft are connected by a coupling 28 which will accommodate such small changes in the length of the shaft. The coupling 28 will be unnecessary in the case of some conventional transmission shafts which have a splined connection at one end or the other.

In each of the four cylinders 11, the piston 14 normally occupies a position (shown in FIGURE 5) intermediate the ends of the cylinder, preferably a position about one-third from the bottom of the cylinder. In this normal position of the piston, the lower chamber 11b of the cylinder is vented to atmosphere by a vent 32 fitted with an air filter to prevent contamination of the interior of the cylinder. In addition, the lower chamber 11b communicates with the atmosphere through an automatically controlled valve 33 which admits air into the chamber 11b on the upstroke of the piston and closes automatically on the downstroke of the piston.

Figure 7:
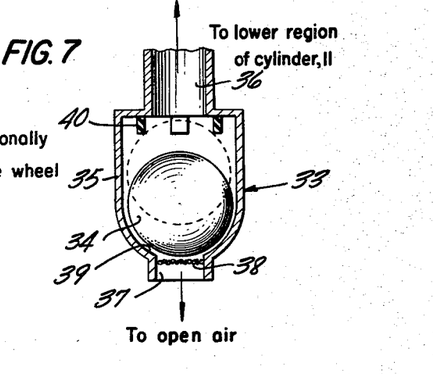
FIGURE 7 is a cross-sectional view of another of the valves utilized in the fluid system.

The valve 33, as shown in FIGURE 7, includes a movable ball valve 34 accommodated within a chamber of a housing 35. The upper end of the housing chamber communicates with the chamber 11b of the cylinder through a conduit 36, and the lower end thereof communicates with the atmosphere through a vent passage 37 containing an air filter 38. The ball valve is normally urged to closed position in contact with a lower seat 39 by gravity or by the pressure within the chamber 11b of the cylinder. The ball valve, however, is free to rise in response to a reduction in pressure within the chamber 11b to admit air into the chamber 11b of the cylinder. A plurality of downwardly projecting studs 40 arranged in circular array at the upper end of the valve housing chamber prevent the ball valve from closing the passage 36 on the upstroke of the piston 14. Thus, for example, when the corresponding wheel hits a bump in the road and the piston 14 moves upwardly within the cylinder, the ball valve opens and admits air into the chamber 11b. On the other hand, when the wheel hits a hole or depression in the road and the piston moves downwardly within the cylinder, closing off the vent 32, the ball valve automatically closes. The piston 14 is sufficiently thick so that it is capable of keeping the vent 32 closed even when the piston is at the extreme bottom of its range of travel in the cylinder 11.

Figure 5:
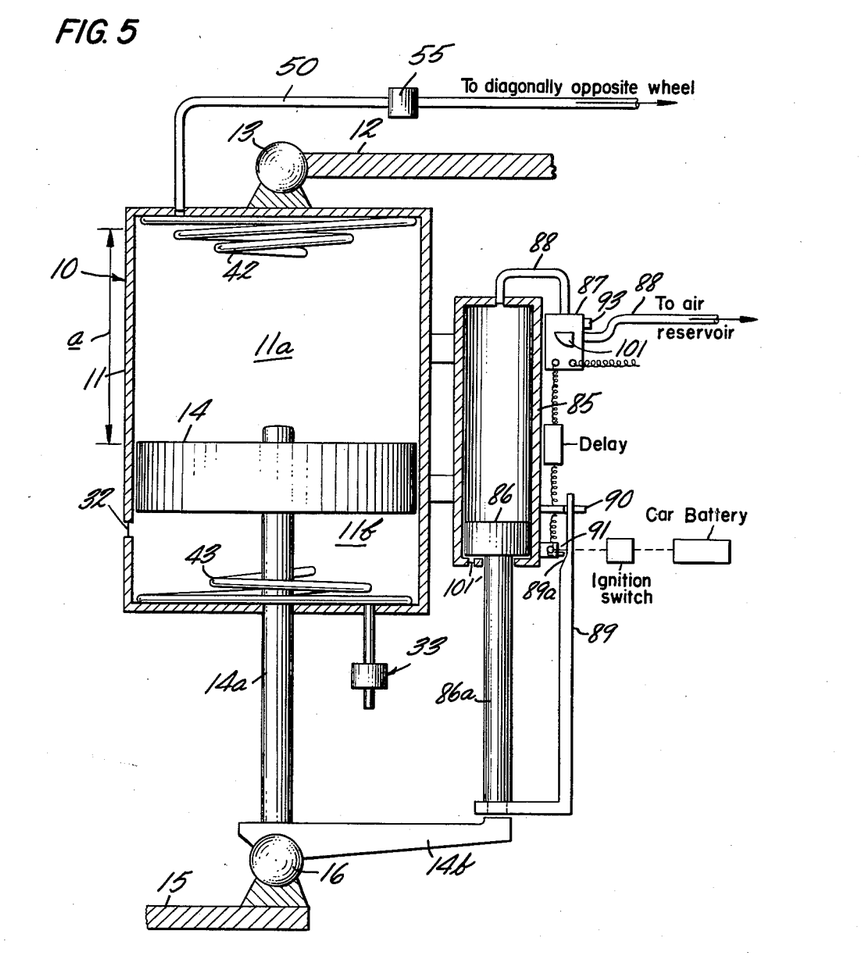
FIGURE 5 is an enlarged cross-sectional elevation of certain of the components shown in FIGURE 3.

As shown in FIGURE 5, the upper and lower ends of the cylinder are provided with compression springs 42 and 43, respectively, to prevent damage and to absorb shock in the event that the piston is driven abruptly to either extreme end of the cylinder.

Figure 2:
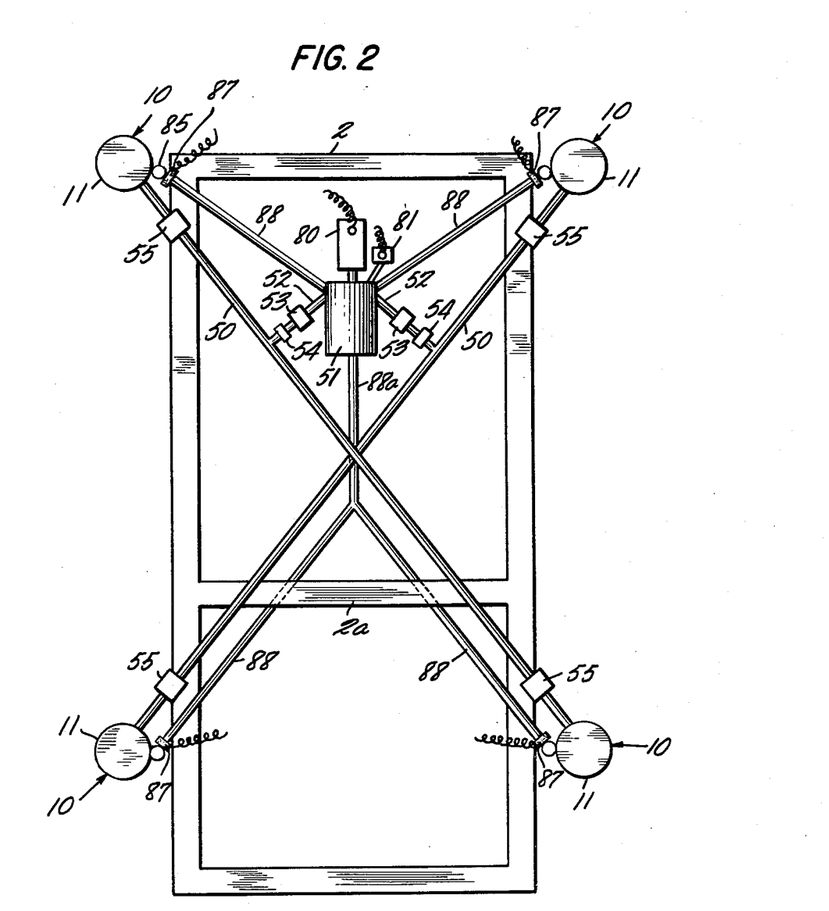
FIGURE 2 is a general plan view of the principal elements of the fluid system.

Each of the corners of the chassis is supported from the respective wheel through the piston and cylinder arrangement 10 by the fluid pressure within the upper region 11a of the cylinder. This fluid, in turn, is introduced therein through a flexible conduit 50 which communicates both with a source of the fluid under pressure and with the piston and cylinder arrangement 10 at the diagonally opposite corner of the chassis. More specifically, as best shown in FIGURE 2, one conduit 50 connects the upper chambers of the cylinders associated with the left front wheel and the right rear wheel, and another conduit 50 connects the upper chambers of the cylinders associated with the right front wheel and the left rear wheel. Each of the two conduits 50 is connected to a reservoir 51 containing a source of the fluid under pressure by a supply conduit 52. The fluid is supplied from this central source to the upper region of each of the cylinders 11.

For purposes of this description, the fluid system for supporting the chassis will be assumed to be a pneumatic system, although certain of the objects of the present invention can be attained by using a hydraulic system. Therefore, in the instances in the appended claims where a hydraulic system would be the equivalent of a pneumatic system, the invention defined by the claim should not be restricted to a pneumatic system. The pneumatic system, of course, has certain obvious advantages over a hydraulic system in that a gaseous fluid is compressible and, therefore, will tend to absorb sudden shock and contribute to a smoother ride.

The supply of compressioned air to each of the conduits 50 is controlled by a valve 53 interposed in the supply conduit 52 (see FIGURE 2). The valve 53 will be described in more detail below in connection with FIGURE 8 of the drawings. For present purposes, it is sufficient to say that the valve 53 operates to maintain the pressure in the respective conduit 50 at or above a predetermined minimum level and also to prevent any reverse flow of air from the respective conduit into the reservoir 51 in the event that the pressure in either of these conduits rises above the predetermined level. In order to prevent damage to the system due to an abnormally high increase in pressure, a safety valve 54 is interposed in the supply conduit 52 downstream of the control valve 53.

The fluid system also includes four pressure-controlled valves 55, one interposed in each of the conduits 50 intermediate the supply conduit 52 and one of the cylinders 11, and preferably in proximity to the respective cylinder. The pressure-controlled valve 55 will be described in more detail in connection with FIGURE 6 of the drawings. For present purposes, it is sufficient to say that the control valve 55 closes in response to a reduction below a predetermined level in the air pressure in the upper chamber of the cylinder, thus preventing air from rushing into the upper chamber of the cylinder when the wheel hits a hole.

Figure 6:
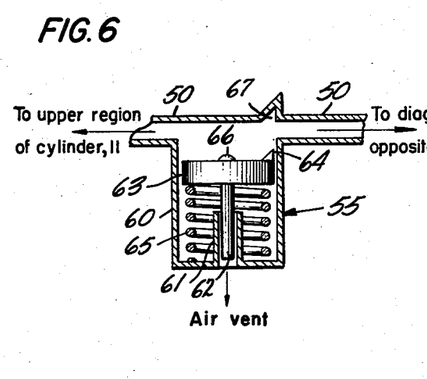
FIGURE 6 is a cross-sectional view of one of the valves utilized in the fluid system.

Referring to FIGURE 6 of the drawings, the valve 55 comprises a housing 60 having an upstanding internal sleeve 61 at the bottom thereof for guiding a stem 62 of a movable pressure-controlled piston 63. The pressure-controlled piston or actuator 63 carries a gate valve 64 which in closed position is received within an upper recess 67 of the conduit 50. A compressed spring 65 within the housing acts on the piston 63 to urge the valve to closed position.

The valve 55 operates to shut off the flow of compressed air from the reservoir 51, the conduit 50 and the diagonally opposite cylinder when the pressure in the chamber 11a of the cylinder with which it is associated falls below a predetermined normal pressure. When the pressure in the chamber 11a is at or above this predetermined value, it exerts a downward force on the piston 63, overcoming the force exerted by the spring 65 to maintain the valve 64 in open position. However, when the pressure of the chamber 11a falls below this predetermined value, such as when the piston moves downwardly in the cylinder due to the wheel hitting a hole or depression in the road, the reduction in pressure within the upper chamber 11a of the cylinder permits the spring 65 to lift the piston and close the valve. The arresting stud 66 atop the piston 63 prevents complete closing of the valve so that the system can be charged preparatory to putting it back into operation after the vehicle has been laid up for some time with the battery removed.

Figure 8:
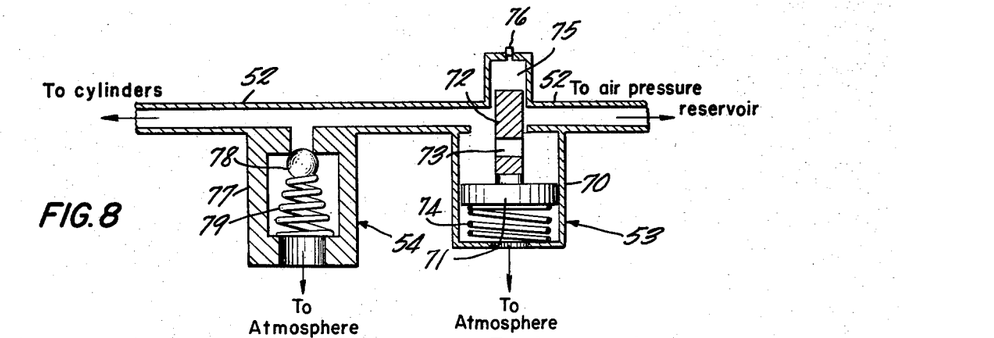
FIGURE 8 is a cross-sectional elevation of a check valve and pressure escape valve utilized in the fluid system of the present invention.

As shown in FIGURE 8, the valve 53 comprises a housing 70 containing a pressure-controlled piston 71 which carries a gate valve 72 containing a passage 73 therethrough. An extended spring 74 acts on the piston 71 to raise the gate valve 72 into the damping chamber 75 of the conduit 52, thereby aligning the passage 73 with the upstream end of the conduit 52 to admit air from the reservoir 51 to the conduit 50 and the pair of cylinders in communication with the conduit 50. The underside of the piston 71 is exposed to atmospheric pressure, and the upper surface of the piston is in communication with the conduit 52 on the downstream side of the gate valve 72. Thus, when the pressure in the conduit 50 is above a predetermined value, the pressure overcomes the upward force exerted by the spring and maintains the piston 71 in its lowermost position, moving the passage 73 out of alignment with the conduit upstream of the gate valve and thereby shutting off the supply of air from the reservoir. On the other hand, when the pressure in the conduit 50 drops below the predetermined value, the gate valve is raised until the pressure builds up to the desired level.

The purpose of the damping chamber 75 is to slow down the upward movement of the gate valve 72 to prevent it from opening in response to very brief pressure drops below the desired pressure level of the system, such as transitory pressure drops caused by a wheel hitting a hole in the road. Obviously, if the gate valve 72 operated instantly in response to such brief drops in pressure, when the wheel in question has passed over the hole, the pressure in the chamber 11a would increase to too high a level, and the piston would not be restored to its normal position in the cylinder. The rate of response of the gate valve 72 to a sudden decrease in pressure in the conduit 50 is determined by the size of the restricted passage 76 of the chamber 75.

The safety valve 54 on the downstream side of the pressure control valve 53 prevents the pressure from building up too high within the system. The relief valve 54 comprises a housing 77 containing a valve 78 which is normally maintained closed by compressed spring 79. When the pressure in the system increases above a predetermined value, the air pressure is relieved against the action of the spring.

In the operation of the fluid system as thus far described, when one of the wheels, for example, the left front wheel, hits a bump, the respective wheel plate 7 is driven upwardly causing the bracket 15 to drive the piston upwardly, thereby increasing the pressure in the upper chamber 11a of that cylinder. This increase in pressure is transmitted to the diagonally opposite corner, in this example, the upper chamber of the cylinder connected to the rear right corner of the chassis. Thus, the upward motion of the wheel is divided substantially evenly between the diagonally opposite corners of the chassis, and they are lifted together approximately one-half the distance of the upward displacement of the wheel while at the same time maintaining the chassis level. On the other hand, when a wheel hits a hole, the piston tends to move downwardly in the cylinder, compressing the air in the lower chamber 11b of the cylinder and reducing the pressure in the upper chamber 11a of the cylinder. This reduction in the pressure in the chamber 11a closes the corresponding control valve 55 and permits the pressure to fall within the upper chamber 11a of the cylinder. Moreover, as will be explained below in more detail, any downward tilting action of one corner of the chassis resulting from the wheel hitting a hole will be compensated for by the reduction in pressure in the upper chamber of the diagonally opposite cylinder.

The air reservoir 51 is charged by a motor-driven compressor 80 (see FIGURE 2) which is supplied with electrical power from the battery of the car. An automatic valve 81 maintains a predetermined minimum pressure in the reservoir by actuating the compressor whenever the reservoir pressure falls below this minimum. Toward this end, the valve 81 controls a contact (not shown) through which current is supplied to the compressor motor. The reservoir is also equipped with a relief valve (not shown) to prevent the pressure from building up to too high a level.

The pressure maintained within the reservoir 51 depends upon the design of the system and the load to be carried. For the suspension system to operate in the desired manner, as explained above, the pressure and quantity of the air maintained within the upper chambers of the four cylinders and in the connecting conduits 50 should not only be high enough to support the vehicle, but also to maintain the pistons and cylinder in approximately the relative positions indicated in FIGURE 5 of the drawings, that is to say, positions such that the normal position of each piston is intermediate the ends of the respective cylinder and preferably about one-third the distance from the bottom of the cylinder. Obviously, the pressure in the central reservoir should be substantially higher than the pressure at which the valves 53 open and the pressure at which the valves 55 close. The valves 53 and 55, in turn, are designed so that the valves 55 close and the valves 53 open at the same pressure, although, as explained above, a delay is interposed in the operation of the valves 53 so that they will not open each time a wheel hits a bump.

By way of illustrating a typical fluid system, if each main cylinder has an internal diameter of four inches, and if the designed weight on any one wheel is 1,000 pounds, then when the vehicle is at rest, an average air pressure of 80 p.s.i. in each of the chambers 11a of the four cylinders will carry the load. Furthermore, if the maximum distance $a$ (see FIGURE 5) traveled by the piston 14 from its normal position to the top of the main cylinder is assumed to be four inches, the volume of air displaced by the piston in moving this distance $a$ is 50 cubic inches. Assuming further that the flexible conduit 50 from one cylinder to the diagonally opposite cylinder is five feet long and has an internal diameter of one-quarter of an inch, the total volume of this conduit is about 12 cubic inches. Thus, the total volume of the closed fluid system described above (consisting of any two diagonally opposite cylinders and the connecting conduit) is about 112 cubic inches when both pistons are in their normal positions. If the piston in one cylinder is driven upwardly by a bump in the road from its normal position to the top of the cylinder, the volume of air in the closed system is temporarily reduced to 62 cubic inches and the pressure is raised by 80%, that is to say, from about 80 p.s.i. to 144 p.s.i. to provide the desired lifting action at diagonally opposite corners of the vehicle.

Turning now to a more detailed description of the operation of the fluid suspension system described above, if one of the wheels, say the left front wheel, hits a bump, the corresponding piston 14 is driven upwardly, compressing the air in the upper chamber 11a of the cylinder. This action would tilt the front left corner of the chassis were it not for the fact that the pressure increase is transmitted through the conduit 50 to the upper chamber of the cylinder associated with the right rear corner of the chassis. Since the pressures in the upper chambers of the diagonally opposite cylinders increase equally, both the left front corner and right rear corner of the chassis are raised by equal amounts, approximately one-half the vertical displacement of the wheel striking the bump, with the result that no tilting action is imparted to the chassis. After the bump is passed, the left front wheel will drop back to its pre-bump position relative to the chassis and the air pressure in the upper chambers of the diagonally opposite cylinders and in the connecting conduit will be restored to its initial value, lowering the chassis to its initial level above the road surface.

In the operation just described, the vent 32 will prevent any retardation in the decompression of air in the chambers 11a after the wheel has passed over the bump. For example, if the bump which the wheel hit was severe, so that the piston was forced nearly to the top of the cylinder, the build-up in pressure in the closed system will tend to restore the piston to its initial position. However, this downward movement of the piston (or upward movement of the cylinder) would tend to compress the air in the lower chamber 11b of the cylinder and thus delay return of the piston to its initial position were it not for the vent 32 located just below the normal position of the piston.

In the event that the left front wheel hits a hole, the wheel will drop relative to the chassis, moving the piston toward the bottom of the cylinder and reducing the air pressure in the upper chamber 11a. The reduction in pressure in the chamber 11a, in turn, closes the valve 55 associated with that cylinder and thus prevents any inflow of air from the conduit 50, from the right rear cylinder, or from the reservoir 51 (although assuming that this reduction in pressure is slight due to the immediate closing of the valve 55 and is only momentary, the slow operating valve 53 will not be likely to open to charge the system from the reservoir). It might be expected that because of the drop in pressure in the upper chamber 11a of the left front cylinder the left front corner of the chassis would immediately start to tilt downward, but four factors either prevent this tilt from taking place or reduce it to unimportant size. First, if the original weight distribution of the vehicle is reasonably symmetrical, a temporary lessening of the support under any one corner of the vehicle when it is in motion will not *immediately* cause the chassis to tilt appreciably toward that corner because of the inertia of momentum. In this respect, the initial effect on the chassis of hitting a hole is by no means the exact opposite of the effect of hitting a bump. Second, the initial downward movement of the piston in the cylinder of the left front wheel below the normal position when the wheel hits a hole closes the vent 32 and the valve 33, and as a direct consequence, it compresses the air in the lower chamber 11b of that cylinder. This compression both cushions and resists the downward movement of the piston, helps prevent the wheel from dropping freely into the hole, and decreases the speed and amount per unit of time by which the pressure in the upper chamber 11a of the cylinder is reduced. This latter effect also reduces the speed and amount per unit of time by which the support for the adjacent corner of the chassis is reduced. These last two effects are the direct consequence of the fact that when the vehicle is in motion, both the roughly horizontal momentum of the wheel and its adjacent axle assembly, and the stabilizing gyroscopic forces produced by a spinning wheel tend, for a short interval, to maintain the wheel assembly as a whole in its previous path of motion despite the fact that the wheel has hit a hole or depression in the road, thus tending for a short interval to maintain the previous position of the piston in the cylinder. Third, insofar as the chassis does in fact tilt toward the left front wheel, this tends to raise the right rear corner of the chassis and the cylinder attached thereto relative to the adjacent wheel. This draws the piston in the right rear cylinder downward, thus reducing the air pressure in the upper chamber 11a of that cylinder, and as a direct consequence, this reduces the support for the right rear corner of the chassis. To the extent of the latter reduction, the tendency of the chassis to tilt toward the left front wheel is opposed. Fourth, the downward movement of the piston in the cylinder attached to the right rear corner of the chassis also closes the vent 32 and the valve 33 in that cylinder, and as a direct consequence, compresses the air in the lower chamber 11b of that cylinder. This compression forces the right rear corner of the chassis to bear an increasing portion of the weight of the right rear wheel and the adjacent axle assembly, and thus tends to oppose any downward tilt of the left front corner of the chassis. The combined result of the third and fourth effects is hence the creation of a tendency of the right rear corner of the chassis to move downward relative to the respective wheel, thus tending to oppose any original tendency of the left front corner of the chassis to tilt downward when the left front wheel hits a hole. The combined result of all four effects taken together either prevents the chassis from tilting toward the wheel that hits the hole, or at least reduces the tilt to a negligible magnitude.

When the hole in the road is passed and the wheel and the main piston move up again, the valve 33 opens to admit air into the chamber 11b, thereby helping to restore the piston to its initial or normal position.

If both front wheels hit bumps at the same time, one bump will cause the left front and the right rear corners of the chassis to rise, and the other will similarly cause the right front and the left rear corners to rise. The chassis as a whole, however, will remain in a horizontal plane, although it will be lifted somewhat higher above the general road surface than before. After the bumps are passed, of course, the chassis will drop back to its previous position. If both rear wheels hit bumps, the action is the same as described above. If both front wheels or both rear wheels hit holes, the chassis will drop slightly with respect to the road surface, but without any significant tilting action.

If the vehicle when in motion hits a curve to the left, for example, the vehicle will tend to tilt toward the right. This tilt tends to lower the right-hand side of the vehicle relative to the respective wheels, and to raise the left-hand side of the vehicle relative to the respective wheels. This produces two counteracting effects. First, as a direct consequence, the tilt will compress the air in the upper chamber 11a of each of the two right-wheel cylinders which are on the outside of the curve, while reducing the air pressure in the upper chamber 11a of each of the two left-wheel cylinders which are on the inside of the curve, thus tending to counteract and reduce the rightward tilt of the vehicle on the curve. Second, as each left-wheel cylinder moves upwardly, the respective piston closes the vent 32 and then the valve 33 in that cylinder, and as a direct consequence, it compresses the air in the lower chamber 11b of that cylinder. This causes the left-hand side of the chassis, which is tending to rise relative to the respective wheels, to carry an increasing part of the weight of the left-hand wheels and adjacent axle assembly, thus further tending to counteract and reduce the rightward tilt of the vehicle on the curve. The two effects in combination will thus produce a substantial force working to counteract and reduce the original tendency to tilting on a curve. Insofar as they are inadequate in a particular situation to restore the vehicle completely to a level position, the auxiliary fluid pressure system described below will also come into operation, and will substantially restore the vehicle to a level position.

The auxiliary fluid pressure transmitting system, about to be described, has a three-fold purpose: (1) to raise the lower corner or corners of a tilted surface to the extent that the devices and arrangements already described are inadequate in a particular situation to prevent or correct such tilt, (2) within the power of the auxiliary system itself, to restore the tilted surface to an approximately horizontal position, and (3) to maintain the necessary quantity of fluid in the main fluid system to keep the pistons at the desired normal positions with respect to the cylinders.

Most vehicles have their centers of gravity well above the centers of the wheels. As a result, if the vehicle takes a curve at high speed, it tends to tilt outwardly, dipping the side of the vehicle on the outside of the curve and raising the side of the vehicle on the inside of the curve. With the proposed new suspension system, two different sets of corrective forces are brought into play to minimize this tilting action. First, as explained above, when the side of the chassis on the outside of the curve starts to dip, the two main cylinders 11 attached to that side of the chassis move downward relative to their stationary pistons, thereby increasing the air pressure within the upper chambers 11a thereof and counteracting the tilting action. At the same time, the outward tilting of the vehicle raises the cylinders of the side of the chassis on the inside of the turn, closing the vents 32 and the valves 33 and compressing the air in the lower chambers 11b of the cylinders. In this connection, it should be mentioned that the closing of the valves 55 associated with the cylinders on the inside of the curve prevents the higher pressure of the upper chambers of the outside cylinders from being transmitted to the upper chambers of the inside cylinders. The increased compression in the lower chambers 11b of the cylinders on the inside of the curve also helps because it makes these cylinders carry a part of the weight of the inside wheels and wheel plates.

The second corrective force is produced by the auxiliary fluid system about to be described which operates to minimize the degree of tilt to the extent to which the auxiliary system is capable.

Referring to FIGURES 3 and 4, and particularly FIGURE 5 of the drawings, each of the main cylinders 11 of the suspension system of the present invention has an auxiliary cylinder 85 rigidly attached thereto. The auxiliary cylinder 85 accommodates a movable piston 86 therein to which a downwardly extending piston rod 86a is attached. The upper end of each of the cylinders 85 is automatically connected either to atmosphere or to the reservoir 51 through a solenoid-actuated valve 87, depending on the relative positions of the auxiliary piston and cylinder. More specifically, the valve 87 associated with each auxiliary cylinder is interposed in a conduit 88 which communicates at one end with the upper chamber of the respective auxiliary cylinder and at the other end with the reservoir 51. As shown in FIGURE 2, the conduits 88 associated with each of the front wheels connect directly with the reservoir 51, whereas the conduits 88 associated with the rear wheels both connect with a conduit 88a which, in turn, is connected directly with the reservoir 51.

The piston rod 86a carries an upstanding switch-actuating element 89, the upper end of which is received within a slotted portion of a guide 90 attached to the auxiliary cylinder. The switch-actuating element 89 has a raised cam surface 89a which actuates a switch 91 when the relative movement between the auxiliary cylinder and piston causes the piston to move upwardly in the cylinder. The actuation of this switch 91 controls the operation of the solenoid-actuated valve 87, the source of electrical energy being obtained from the car battery.

Figure 9:
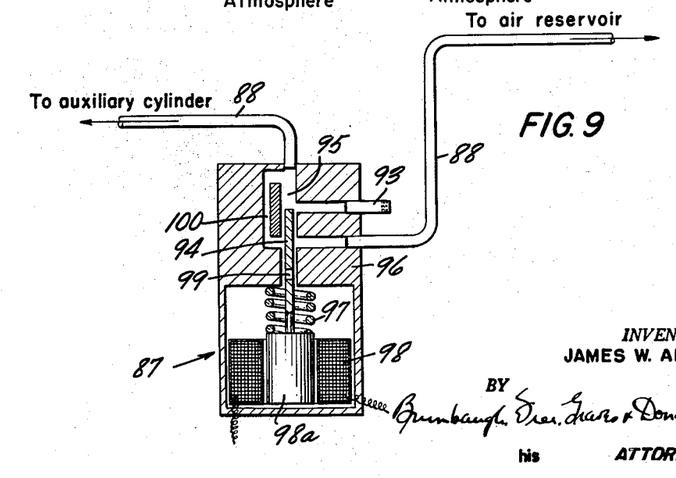
FIGURE 9 is a cross-sectional view of a solenoid-actuated valve utilized in the fluid system.

The solenoid-actuated valve 87 is shown in detail in FIGURE 9 of the drawings. As shown in that figure, the upper chamber of the auxiliary cylinder is normally in communication with a vent passage 93 containing an air filter when the gate valve 94 is in its lower-most position within the passage 95 of the housing 96. The gate valve 94 is connected to a movable core 98a of the solenoid, and when the solenoid coil 98 is not energized, a compressed spring 97 maintains the gate valve in the position shown in FIGURE 9. However, when the coil is energized by the actuation of the switch 91, the gate valve 94 is raised, closing off the vent 93 and bringing a port 99 into registry with a bypass passage 100 to establish communication between the reservoir 51 and the upper end of the auxiliary cylinder. This actuation of the valve 87 admits pressure into the upper end of the cylinder to drive the piston downwardly. A vent 101' at the bottom of the cylinder prevents compression of the air in the chamber below the piston which would retard the downward movement of the piston. The vent 101', as in the case of all passages of the apparatus leading to atmosphere, contains an air filter therein.

Since the full stroke of the auxiliary cylinder from bottom to top is equal to the stroke of the piston of the main cylinder from its normal position to the top of the cylinder or, in other words, the distance a, the upper bumper spring 42 of the main cylinder will also serve as a bumper for the piston of the auxiliary chamber. However, it may be desirable to place a bumper spring at the lower end of the auxiliary cylinder.

The normal position of the piston 86 is at the bottom of the auxiliary cylinder 85 when the auxiliary fluid system is not in operation. When the piston 14 of the corresponding main cylinder is in its normal position shown in FIGURE 5, the laterally extending bracket 14b carried by the piston rod 14a is disposed just beneath and in contact with the piston rod 86a of the auxiliary cylinder. If relative movement between the cylinder 11 and the piston 14 moves the piston upwardly in the cylinder from the normal position of the piston, there will be an equal displacement of the piston 86 with respect to the auxiliary cylinder, bringing the raised cam surface 89a into contact with the switch 91. As will be explained below, the solenoid-actuated valve 87 has a time delay interposed in its circuit, so that during the initial upward travel of the piston in the auxiliary cylinder, air is displaced from the upper end of the auxiliary cylinder and exhausted to atmosphere through the open vent 93 of the valve 87. However, as soon as the solenoid-actuated valve 87 is operated, communication is established between the upper end of the cylinder and the high pressure air in the reservoir 51. This air at high pressure will be introduced into the upper end of the auxiliary cylinder 85 and will act against the piston 86, but since the piston rod 86a thereof is in engagement with the bracket 14b which, in turn, is directly connected with the wheel in contact with the road surface, the result of the increase in pressure within the upper part of the auxiliary cylinder is to raise both the auxiliary and main cylinders and the respective corner of the chassis relative to the ground, thereby reducing the tilt of the chassis. Both the auxiliary and main cylinders will continue to rise until the relative movement between the main cylinder 11 and its piston 14 has restored the piston 14 to its normal position, at which time the switch 91 carried by the auxiliary cylinder will have been lifted out of engagement with the raised cam portion of the switch-actuating element 89. This actuation of the switch 91 will de-energize the coil of the valve 87 and operate the valve to close the connection between the high pressure air reservoir 51 and the upper end of the auxiliary cylinder and vent the upper chamber of the auxiliary cylinder to atmosphere. In this connection, it might be mentioned that the separation between the raised cam surface 89a and the switch 91 when the piston 86 is at its normal position at the bottom of the cylinder 85 has been somewhat exaggerated in FIGURE 5 of the drawings so that the respective parts can be more easily identified.

It is apparent that this auxiliary system will come into operation when the vehicle is tilted for a prolonged period in turning, for example, in traveling on a curve or on a sloped surface. By way of illustration, in the case of a vehicle traveling on a curve, as explained above, there will be a tendency of the vehicle to tilt toward the outside of the curve, thereby producing relative movement between the two auxiliary cylinders and pistons of the vehicle on the outer side of the curve. As a result, these two auxiliary cylinders and their respective corners of the chassis are lifted in synchronism by fluid pressure admitted to the auxiliary cylinders to minimize the tilting action of the vehicle. In the case of a vehicle ascending or descending a slope, the two rearward or two forward auxiliary cylinders will be lifted in synchronism to minimize the tilt. Since the side or end of the vehicle which is raised by traveling on a curve or slope will cause the respective piston rods 86a of the vehicle to be raised with respect to the laterally extending brackets 14b, these units of the auxiliary system will not function.

Obviously, it would be both unnecessary and undesirable able to have the auxiliary cylinders brought into action every time a wheel hits an ordinary bump; yet, it is essential to have the auxiliary cylinders operate when the vehicle is subjected to any protracted tilting tendency as a result of meeting a curve or traveling on a slope. The desired effect can be achieved by interposing a delay in the electrical circuit which energizes the coil 98 of the solenoid-actuated valve 87. For example, this can be readily accomplished by placing a delayed action electrical relay in the circuit of the coil 98 and by having the switch 91 activate the delayed action relay. This arrangement is schematically shown in FIGURE 5 of the drawings. With this arrangement the auxiliary system will not come into operation each time a car hits a bump, since the combined upward and downward movement of a wheel relative to the chassis upon hitting a bump usually lasts only a fraction of a second and usually less than half a second. Thus, if the time delay postpones the operation of the solenoid coil 98 for somewhat more than half a second, the auxiliary cylinder will not come into operation to correct the effects of ordinary road bumps, but will come into action in plenty of time to correct tilting on curves or slopes.

As either a supplementary or an alternative means for controlling the operation of the auxiliary system, and with especial reference to counteracting the tendency of the vehicle to tilt outwardly on a curve, an additional mercury-actuated control switch 101 is also used to operate the solenoid-actuated valve 87. This switch 101 is shown in detail in FIGURE 10, and its location is shown in FIGURE 5. The switch 101 is connected in series with the ignition switch, and when both switches are closed a circuit is completed from the car battery to energize the coil 98 and the valve 87. This circuit, therefore, controls the operation of the valve 87 independently of the circuit completed through the switch 91. Alternatively, however, the switch 101 can be used in series with the switch 91.

Figure 10:
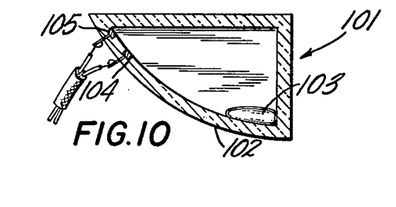
FIGURE 10 is an elevational view in cross-section of a switch shown in FIGURE 5.

The switch 101 includes an enclosed electrically non-conductive housing 102 having a bottom which curves upwardly toward the respective side of the vehicle, a drop of mercury 103 of appropriate size, and two spaced apart electric contacts 104 and 105 at the upper end of the curved bottom of the housing. The contacts 104 and 105 are recessed in the bottom wall of the housing 102 so as to provide a smooth surface for the mercury drop.

When the vehicle is in motion and meets a leftward curve, for example, and hence tends to tilt toward its outer or rightward side, the drops of mercury in the switches 101 on the right side of the vehicle will be displaced outwardly by centrifugal force toward the contacts 104 and 105. The mercury drops of the switches on the left side of the vehicle remain at the bottom of their respective housings. At a predetermined centrifugal force, the mercury drop in each switch on the right side of the vehicle will move far enough to the right and up the sloping surface of the housing to close the switch, thus actuating the respective solenoid-actuated valve 87 and putting the respective auxiliary cylinder and piston unit into instantaneous operation. As a direct consequence, the respective righthand corners of the chassis will be lifted relative to the respective wheels, thus to restore the chassis to an approximately level position despite the curve. The switches 101 remain closed throughout the travel of the vehicle on the curve as long as the centrifugal force exerted on the mercury drops equals or exceeds the predetermined minimum. If the operation of the righthand auxiliary cylinders happens to over-compensate for the lefthand curve in a particular situation, thus tending to tilt the vehicle somewhat to the left on the leftward curve, the design of the housing 102 of each switch is such that the mercury drop 103 will fall down the inside of the housing to the left, thus breaking the contacts 104 and 105, de-energizing the valve 87 and allowing the piston to move upward in the auxiliary cylinder. Since the design of valve 87 is such as to prevent rapid decompression of the auxiliary cylinder, this adjustment will not impart any rolling, oscillatory movement to the vehicle.

When the vehicle either leaves the curve or ceases to move, the mercury drops 103 of the operative switches will return to their lowermost positions, breaking the circuits. The valve 87 will then be de-energized and the air pressure in the respective auxiliary cylinder will be vented.

If the vehicle meets a rightward curve, on the other hand, the switches 101 on the right side of the vehicle will remain open and the switches on the left side of the vehicle will close, bringing the auxiliary system on the left side of the vehicle into operation.

Thus, the auxiliary system, within the limits of its own power and size, always operates when the vehicle is in motion to correct any tilt of the vehicle in a lateral direction which is not otherwise corrected, and to restore the vehicle to an approximately level position. Both the instantly-operating mercury-actuated switch 101 just described and the slower-operating rod-actuated switch 91 described earlier are capable of placing the auxiliary system in operation when the vehicle meets a curve. The switch 101 keeps the auxiliary system in operation and the vehicle approximately level as long as the vehicle is in motion on a curve and the resulting centrifugal force equals or exceeds the predetermined minimum. The switch 91, on the other hand, places the auxiliary system in operation, with a slight delay, when the vehicle is subjected to any other type of lateral or longitudinal tilt that is not otherwise corrected. If the switches 91 and 101 are used in series, instead of as components of separate circuits, the auxiliary system will be rendered operative only in response to both a tilt of the vehicle and the effect of centrifugal force.

While it is essential to have the auxiliary cylinders come into action to counteract tilting on curves when the vehicle is in motion, it is unnecessary and entirely undesirable to have them come into operation to counteract any tilting when the vehicle is at rest. Such tilting, for example, might be due either to a severe asymmetrical distribution of the load or to parking the vehicle on sloped terrain. Therefore, it is preferred that the auxiliary system be rendered inoperative when the ignition switch is shut off (as schematically illustrated in FIGURE 5), or when the vehicle is not in motion. This latter result can be achieved in various ways, for example, by placing a relay in the circuit of the switch 91 which is normally maintained closed by a small motor or magneto driven from the transmission shaft 27 of the vehicle. While the vehicle is at rest the relay will be open, and the switch 91 will have no control over the solenoid-actuated valve 87.

There is, of course, no possibility that the auxiliary system will come into operation when a wheel hits a hole because the main piston 14 and the bracket 14b movable therewith are displaced downwardly away from the lower end of the piston rod 86a of the auxiliary unit. Since the normal position of the piston 86 of the auxiliary cylinder is at the lower end thereof, the auxiliary system will not be at all influenced by the wheel hitting the hole or depression.

Another important function of the auxiliary fluid system is to keep the main fluid system charged with the quantity of fluid necessary to maintain the main cylinders and pistons in the desired relative positions under normal conditions of operation. If, for example, over a period of time leakage from the main fluid system reduces the quantity of fluid and causes the main cylinders to drop relative to the pistons, the normal positions of the pistons in the cylinders will be somewhat higher than desired. However, when the cylinders drop sufficiently to bring the switches 91 of the auxiliary cylinders into engagement with the raised cam surfaces 89a, air will be introduced into the auxiliary cylinders to raise the auxiliary cylinders, the main cylinders and the chassis until the pistons 14 are restored to their proper positions in the main cylinders. During this operation, the pressure will be decreased in the conduits 50, causing the valves 53 to build up the pressure therein so that when the pistons are restored to their proper positions in the main cylinders, the quantity of air introduced into the main system will be sufficient to maintain the pistons at the proper position in the main cylinders. If the valves 55 close during this operation, pressure in the upper chambers of the cylinders 11 will be restored by the leakage through the respective gates.

The effect of the auxiliary cylinder system in maintaining the vehicle approximately level on curves in combination with the effect of the various radius rod arrangements prevent any appreciable lateral movement of the chassis relative to the wheels which might cause swaying on curves. Toward this end, the radius rods 3 (see FIGURE 1) which connect the front wheels to the chassis prevent lateral movement of the chassis relative to the front wheels, except for a negligible amount of lateral movement resulting when a front wheel moves up or down relative to the chassis in the small arc determined by the radius rods themselves as they pivot at their fixed ends. Similarly, the rigid rods 21 and 24, which connect the rear axle and rear wheels to the chassis, prevent any lateral movement of the chassis relative to the rear wheels, except for a negligible amount of lateral movement resulting when a rear wheel moves up or down relative to the chassis. The elimination of such lateral motion of the chassis is in sharp contrast to the behavior on curves of most vehicles with conventional suspensions and affords a substantial safety advantage.

If a vehicle equipped with the suspension system of the present invention has been in storage for a period of time without a battery, the air pressure in the main system may very well have been dissipated through slow leakage with the result that the pistons in each of the main cylinders will be resting against the upper ends of the main cylinders. Since the vehicle has no resilient support, it is apparent that it should not be operated in this condition. However, when the battery is replaced the motor-driven pump or compressor 80 will build up the reservoir pressure to the designed limit and the pressure in the system will be built up notwithstanding the fact that each of the valves 55 are closed because as explained above, these valves are designed to allow a slow leakage in pressure past the respective gates.

When the auxiliary cylinders are brought into operation the pressure in the central air reservoir 51 is correspondingly lowered and must be restored by the automatic action of the motor-driven compressor. The resulting power drain from the car battery can be greatly reduced by modifying the system along the following lines. In the system as described above, when any one auxiliary cylinder which had previously been in action ceases to operate, air still under high pressure is vented through the vent 93 of the valve 87. In the modified system, this high-pressure air, instead of being allowed to escape into the outside atmosphere, can be led by tubing from the vent 93 directly back to the intake of the compressor. The power which will then be required to restore the minimum designed pressure in the reservoir will obviously be little more than half as much as if the pump were here fed by air at only atmospheric pressure. However, to prevent any interference with the normal free venting of air at substantially atmospheric pressure from the valve 87 and the auxiliary cylinder after the piston in this cylinder has been driven up by momentary road shocks to the adjacent wheel, in which case the auxiliary system will not be brought into operation, a spring-urged ball valve can be provided in the passage 93. This valve can be arranged to remain open and thus release air freely from the auxiliary cylinder to the outer atmosphere under ordinary conditions when the auxiliary cylinder itself has not been brought into operation, but to shut when the auxiliary cylinder has been in operation and is now venting air at high pressure (the pressure against the ball compresses the spring and thus closes the valve). In this arrangement, the high-pressure air will be channeled directly to the air pump intake. To prevent interference with the supply of air to the compressor when the venting of the auxiliary cylinder is not feeding high-pressure air to the pump, another ball valve can be provided to keep the feed to the pump from the outside atmosphere open under normal conditions, but to close it when air is being supplied under pressure from the auxiliary cylinder by the conduit described above. These variations will decrease the power requirements of the proposed new suspension system.

The novel suspension system of the present invention described above will maintain the vehicle in substantially level condition when the vehicle is in motion. More specifically, it will help prevent tilting of the vehicle when one wheel hits a bump or when one wheel hits a hole or depression in the road. Moreover, the upward displacement of the vehicle as explained above will only be about half as great as the upward movement which would have been imparted to the corner of the chassis nearest the wheel hitting the bump in conventional suspension systems where that corner receives the whole effect of the impact. The system also eliminates the fore-and-aft pitching motion which occurs in conventional systems when both front wheels hit bumps at the same time, since with the system of the present invention the upward force of hitting the bumps is distributed equally to all corners of the vehicle; the vehicle, therefore, will not "pitch" or "gallop." Tilting and swaying on curves is eliminated, thereby reducing the danger of the vehicle turning over on curves. Furthermore, since the weight of the vehicle on a curve is more evenly distributed on both the inside and outside wheels, the danger of skidding on curves is greatly decreased. The foregoing advantages and characteristics of the fluid suspension system of the present invention make for greatly increased safety and comfort in driving.

The invention has been shown and described in preferred form and by way of example only, and obviously many variations and modifications may be made therein without departing from the spirit of the invention. It is to be understood, therefore, that the invention is not to be limited to any specified form or embodiment, except insofar as such limitations are expressly set forth in the claims.

I claim:

1. A suspension system for supporting a chassis from a pair of spaced-apart front and a pair of spaced-apart rear wheels comprising fluid cushion means between each wheel and the chassis, said cushion means including relatively movable elements separated by a chamber containing a fluid which provides support for the chassis, one element being connected with the chassis and the other with the wheel, means transmitting a pressure increase in the chamber of one cushion means caused by relative movement of said elements toward each other from their normal positions to the corresponding chamber of the diagonally opposite fluid cushion means, whereby relative movement between the movable elements of one cushion means which tends to raise one corner of the chassis will transmit the pressure to the diagonally opposite cushion means to displace the relatively movable elements thereof so as to raise the diagonally opposite corner of the chassis, and means preventing a pressure decrease in the chamber of one cushion means, as in the case of the cushion means of the inside wheels on a turn or the cushion means of a wheel which hits a hole, from being transmitted to the chamber of the diagonally opposite fluid cushion means.

2. In a suspension system for supporting a chassis from wheels comprising a fluid charged piston and cylinder arrangement supporting each corner of the chassis from a wheel, each of said pistons cooperating with the cylinder to define a fluid charged chamber, the pressure in which provides support for the chassis, and means transmitting a pressure increase in the chamber of one cylinder caused by relative movement of said piston and cylinder from their normal positions to the corresponding chamber of the diagonally opposite cylinder so that when the fluid is compressed in one fluid charged cylinder by relative movement between the piston and the cylinder, the resulting increase in pressure is transmitted to the corresponding chamber of the diagonally opposite fluid charged cylinder thereby raising both opposite corners of the chassis, and a vent opening each cylinder on the side of the piston opposite the fluid charged chamber when the piston is in its normal position relative to the cylinder and closing said side of the cylinder when the relative movement of the piston and cylinder from their normal positions expand the size of said fluid charged chamber, as in the case of the cylinders on the inside wheels on a turn and the cylinder of a wheel hitting a hole.

3. A pneumatic suspension system for a vehicle having front and rear wheels comprising a fluid charged piston and cylinder arrangement supporting each corner of the vehicle from the respective wheel, each said piston dividing the chamber of the cylinder into a fluid charged chamber in communication with a source of fluid under pressure and a second chamber, valve means establishing communication between an ambient pressure and the second chamber when the relative movement between the piston and cylinder compresses the fluid charged chamber and closing the second chamber when the relative movement between the piston and the cylinder expands the fluid charged chamber, pressure-transmitting means connecting diagonally opposite cylinders so that when the fluid is compressed in the fluid charged cylinder by relative movement between the piston and the cylinder the resulting increase in pressure is transmitted to a diagonally opposite fluid charged cylinder, thereby raising both diagonally opposite corners of the vehicle equally, and means preventing said transmission of pressure to a fluid charged chamber in which there has been a decrease in pressure caused by the tilting of the chassis on a turn or the corresponding wheel hitting a hole.

4. A suspension system for a chassis supported by front and rear wheels comprising fluid cushioning means connecting each wheel and a respective corner of the chassis, each of said cushioning means including an expandable and contractable chamber for a fluid, the chamber being contracted when the wheel rises with respect to the chassis and expanded when the wheel falls with respect to the chassis, means transmitting a pressure increase caused by the displacement of the elements of one cushioning means toward each other from their normal positions to the corresponding chamber of the diagonally opposite fluid cushioning means, means establishing communication between a source of fluid and each of said expandable and contractable chambers, and means to cut off said communication between the source of fluid under pressure and a particular chamber in response to a reduction in pressure in said chamber.

5. A pneumatic suspension system for vehicles having front and rear wheels comprising fluid cushioning means supporting each of the four corners of the vehicle from the respective wheel, each of said fluid cushioning means including a chamber of variable height for a gaseous fluid, the chamber being reduced in height to compress the fluid when the corresponding wheel hits a bump or when the cushioning means is associated with one of the outside wheels on a turn, passage means transmitting the increased pressure of the compressed fluid to the chamber of the diagonally opposite wheel, and a pressure controlled valve in said passage means which closes said passage in response to a decrease in pressure in the chamber, as when the cushioning means is associated with one of the inside wheels on a turn or when the respective wheel hits a hole.

6. A pneumatic system as set forth in claim 5 including auxiliary pressure means on both sides of the vehicle intermediate the chassis and the wheel, and means controlled by the tilt of the chassis when the vehicle travels on a curve for operating the auxiliary pressure means on one side of the vehicle to reduce the degree of tilt.

7. A pneumatic system as set forth in claim 5 including means to maintain the desired quantity of fluid in said chambers and connecting passages.

8. A pneumatic suspension system for a chassis having front and rear wheels comprising piston and cylinder elements supporting each corner of the chassis with the respective wheel, one of said elements being connected with the wheel and the other with the chassis, each piston being accommodated in its respective cylinder and under normal conditions being positioned in the cylinder to divide it into a first chamber on one side of the piston and a second chamber on the other side of the piston, the first chamber being reduced in size when the wheel hits a bump in the road and the second chamber being reduced in size when the wheel hits a hole in the road, a conduit connecting the first chambers of diagonally opposite cylinders in regions remote from the pistons so that, when one chamber is reduced in size when the wheel hits a bump in the road, pressure will be transmitted through said conduit to increase the size of the first chamber of the diagonally opposite cylinder and a normally open valve in said conduit, said valve closing automatically when pressure is reduced substantially in the first chamber.

9. A pneumatic suspension system as set forth in claim 8 including a source of fluid under pressure and a pressure controlled valve connecting the source of fluid and the conduit, said valve automatically opening to introduce fluid under pressure into the conduit when the pressure falls below the desired level.

10. A pneumatic suspension system as set forth in claim 8 including means for maintaining the desired quantity of fluid in the first chambers and the connecting conduit to position the pistons at their desired normal positions in the cylinders.

11. A pneumatic suspension system for a chassis having front and rear wheels comprising piston and cylinder elements supporting each corner of the chassis from the respective wheel, one of said elements being connected with the wheel and the other with the chassis, each piston being accommodated in its respective cylinder and under normal conditions being positioned in the cylinder to divide it into a first chamber on one side of the piston and a second chamber on the other side of the piston, the first chamber being reduced in size when the wheel hits a bump in the road and the second chamber being reduced in size when the wheel hits a hole in the road, a conduit connecting the first chambers of diagonally opposite cylinders, auxiliary piston and cylinder elements at each corner of the chassis, one of said elements being connected to the chassis, the other being connected to the wheel when the respective corner of the chassis drops from normal position and being disconnected therefrom when the corner is raised from normal position, and means operable in response to a drop in the chassis for introducing fluid under pressure into the auxiliary cylinder to raise the respective corner of the chassis.

12. A pneumatic suspension system for a chassis having front and rear wheels comprising piston and cylinder elements supporting each corner of the chassis from the respective wheel, one of said elements being connected with the wheel and the other with the chassis, each piston being accommodated in its respective cylinder and under normal conditions being positioned in the cylinder to divide it into a first chamber on one side of the piston and a second chamber on the other side of the piston, the first chamber being reduced in size when the wheel hits a bump in the road and the second chamber being reduced in size when the wheel hits a hole in the road, a conduit connecting the first chambers of diagonally opposite cylinders, auxiliary piston and cylinder elements at each corner of the chassis, one of said elements being connected to the chassis, the other being connected to the wheel when the respective corner of the chassis drops from normal position and being disconnected therefrom when the corner is raised from normal position, and means operable in response to centrifugal force in a given direction when the vehicle travels on a curve for introducing fluid under pressure into the auxiliary cylinder to raise the respective corner of the chassis.

13. A pneumatic suspension system for a chassis having two front and two rear wheels comprising main piston and cylinder elements connecting each corner of the chassis with one of the wheels, said piston in its normal position dividing the cylinder into upper and lower chambers, a conduit connecting corresponding chambers of diagonally opposite cylinders, said conduit being in communication with a source of fluid under pressure, the fluid in the chambers connected by the conduit supporting the chassis, auxiliary piston and cylinder elements at each corner of the chassis and relatively movable in response to relative movement between the wheel and the corner of the chassis, and means responsive to a change in the relative positions of said main piston and cylinder elements resulting from leakage of fluid past a main piston to produce relative movement between the auxiliary piston and cylinder elements, and means responsive to the relative movement between the auxiliary cylinder and piston elements for introducing additional fluid into said conduit to restore the main piston and cylinder elements to normal positions.

14. A pneumatic suspension system as set forth in claim 13 including means for maintaining the pressure in said conduit and chambers connected thereby at a predetermined level.

15. A pneumatic suspension system for a chassis having front and rear wheels comprising piston and cylinder elements connecting each corner of the chassis with one of the wheels, said piston in its normal position dividing the cylinder into upper and lower chambers, a conduit connecting the upper chambers of diagonally opposite cylinders at points spaced away from the respective pistons so as not to be closed by the pistons in the normal operation of the suspension system, said conduit and upper chambers of diagonally opposite cylinders being charged with a fluid under pressure, said fluid under pressure supporting the chassis, and valves connecting the lower chambers with the atmosphere, each of said valves closing when the piston moves downwardly with respect to its cylinder and opening when it moves upwardly, the closing of the valve sealing the said lower chamber so that when the respective wheel is on the inside of a turn or hits a hole the sealed fluid within lower chamber will resist downward movement of the piston.

16. A pneumatic suspension system as set forth in claim 15 including a vent establishing communication between an ambient pressure and the lower chamber, said vent being closed by the downward movement of the piston with respect to its cylinder.

17. A pneumatic suspension system as set forth in claim 15 including a valve in said conduit, and means operable in response to a drop in pressure in the upper chamber of the cylinder to close the valve in the conduit.

18. A pneumatic suspension system as set forth in claim 15 including relatively movable auxiliary cylinder and piston elements, one connected to a corner of the chassis, means connected by the wheel and engageable with the other element of said auxiliary cylinder and piston elements, whereby when the respective corner of the chassis and the wheel are moved toward each other the auxiliary cylinder and piston elements are moved relatively to each other, and means controlled by said relative movement of said auxiliary cylinder and piston elements to restore the wheel and corner of the chassis to their desired relative positions.

19. A vehicle comprising a wheel at each corner of the chassis, fluid cushioning means connecting each wheel with the respective corner of the chassis, means translating an upward displacement of one wheel which tends to raise the respective corner of the chassis through the fluid cushioning means into an increase in the fluid pressure of the fluid cushioning means of the diagonally opposite corner of the chassis so that both diagonally opposite corners of the chassis are lifted, and auxiliary presure means on both sides of the vehicle intermediate the chassis and the wheel, and means operable when the vehicle travels on a curve for operating the auxiliary pressure means on one side of the vehicle to reduce the tilt of the vehicle.

20. A fluid suspension system for the chasiss of a vehicle having front and rear wheels comprising fluid cushioning means supporting each of the four corners of the chassis from the respective wheel, each of the fluid cushioning means including a chamber of variable height, passage means transmitting an increase in pressure within a fluid chamber to the chamber of the diagonally opposite wheel, auxiliary pressure means on both sides of the vehicle intermediate the chassis and the wheel, and means operable when the vehicle travels on a curve for operating the auxiliary pressure means on one side of the vehicle to reduce the tilt of the vehicle.

21. A fluid suspension system as set forth in claim 20 in which said operable means includes means controlled by the relative movement between one side of the chassis and a wheel.

22. A fluid suspension system as set forth in claim 20 in which said operable means includes means responsive to centrifugal force.

23. A fluid suspension system for the chassis of a vehicle having front and rear wheels comprising fluid cushioning means supporting each of the four corners of the chassis from the respective wheel, each of the fluid cushioning means including a chamber of variable height, pressure transmitting means connecting the chambers of diagonally opposite wheels, whereby a pressure increase in one chamber is transmitted to the diagonally opposite chamber, a source of fluid under pressure communicating with each of the said pressure transmitting means, auxiliary fluid pressure chambers of variable height intermediate each wheel and the chassis and in communication with said source of fluid pressure, and means operable in response to a drop in the chassis for introducing fluid under pressure into the auxiliary fluid pressure chamber until the chassis is restored to its proper position.

24. A fluid suspension system as set forth in claim 23 including means operable in response to centrifugal force in a given direction when the vehicle travels on a curve for introducing fluid under pressure into the auxiliary fluid pressure chamber to raise the respective corner of the chassis.

25. A fluid suspension system as set forth in claim 23 including means for venting each auxiliary fluid pressure chamber when the wheel and the chassis have been restored to proper relative position.

26. A fluid suspension system as set forth in claim 25 including passage means communicating with said vent for retaining the vented fluid within the fluid system.

27. A fluid suspension system as set forth in claim 23 including time delay means delaying the introduction of fluid under pressure in the auxiliary fluid pressure chamber to prevent said introduction if the chassis is promptly restored to its proper position.

References Cited by the Examiner
UNITED STATES PATENTS

| | | | |
|---|---|---|---|
| 264,859 | 9/82 | Butterfield. | |
| 389,032 | 9/88 | Westinghouse | 137—494 |
| 820,707 | 5/06 | Downer. | |
| 1,446,759 | 2/23 | Mercier | 267—11 |
| 2,715,023 | 8/55 | Nallinger. | |
| 2,862,725 | 12/58 | Jackson. | |
| 2,888,272 | 5/59 | Fletcher. | |
| 2,977,134 | 3/61 | Helling. | |
| 2,986,403 | 5/61 | Ziccardi | 280—104 |
| 3,054,624 | 9/62 | Nallinger | 280—104 |
| 3,079,169 | 2/63 | Fiala | 280—104 |

A. HARRY LEVY, *Primary Examiner.*
PHILIP ARNOLD, LEO FRIAGLIA, *Examiners.*